(12) United States Patent
Park et al.

(10) Patent No.: US 7,356,881 B2
(45) Date of Patent: Apr. 15, 2008

(54) SWIVEL HINGE AND PORTABLE TERMINAL USING THE SAME

(75) Inventors: Ji-Sung Park, Seoul (KR); Red-Heat Oh, Seoul (KR); Sang-Hyuk Im, Gyeonggi-do (KR); Kwon-Jin Kang, Uiwang-si (KR)

(73) Assignee: LG Electronics Inc., Seoul (KR)

( * ) Notice: Subject to any disclaimer, the term of this patent is extended or adjusted under 35 U.S.C. 154(b) by 416 days.

(21) Appl. No.: 10/784,793

(22) Filed: Feb. 24, 2004

(65) Prior Publication Data

US 2005/0005400 A1    Jan. 13, 2005

(30) Foreign Application Priority Data

Jul. 11, 2003  (KR) ............... 10-2003-0047443
Jul. 11, 2003  (KR) ............... 10-2003-0047445

(51) Int. Cl.
*E05D 3/10*    (2006.01)

(52) U.S. Cl. ........................... 16/367; 16/371

(58) Field of Classification Search ............. 16/367, 16/371 X, 320, 361, 342, 363; 292/DIG. 17, 292/251.5; 455/575.3, 575.1
See application file for complete search history.

(56) References Cited

U.S. PATENT DOCUMENTS 6,408,484 B1 *  6/2002  Vandertouw ............... 16/320
6,427,288 B1 *  8/2002  Saito ........................... 16/361
6,549,789 B1 *  4/2003  Kfoury ..................... 455/550.1
7,096,540 B2 *  8/2006  Watanabe et al. ........... 16/367

FOREIGN PATENT DOCUMENTS

| JP | 11182528 | * | 6/1999 |
| JP | 2003337635 A | * | 11/2003 |
| JP | 2004138092 A | * | 5/2004 |
| JP | 2004304458 A | * | 10/2004 |

* cited by examiner

*Primary Examiner*—Patricia Engle
*Assistant Examiner*—Mark Williams
(74) *Attorney, Agent, or Firm*—Ked & Associates, LLP

(57) ABSTRACT

A swivel hinge can have a first hinge section and a second hinge section coupled to the first hinge section to rotate in a direction perpendicular to the first hinge section. The first and second hinge sections can include first and second magnets configured to relatively position the first and second hinge sections with respect to each other. The swivel can include a stopper engagement section provided at one end of a second hinge shaft to rotate together with the second hinge shaft and a stopper having a surface facing a locking surface of the stopper engagement section to restrict rotation of the second hinge section. The stopper can allow the locking surface of the stopper engagement section to freely rotate when the first hinge section rotates by a predetermined angle. The swivel hinge can operate in a portable terminal.

23 Claims, 15 Drawing Sheets

FIG. 1
Conventional
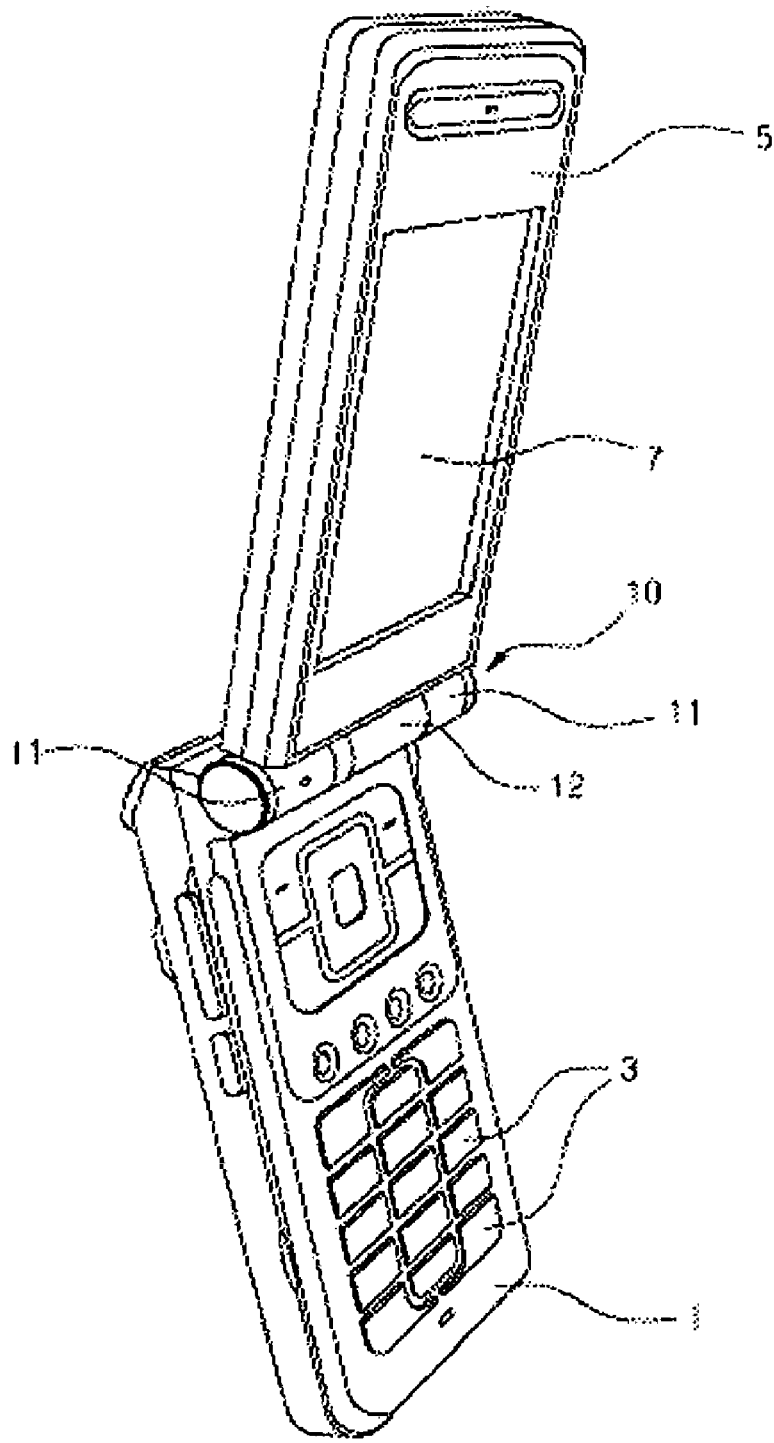

FIG. 2a
Conventional
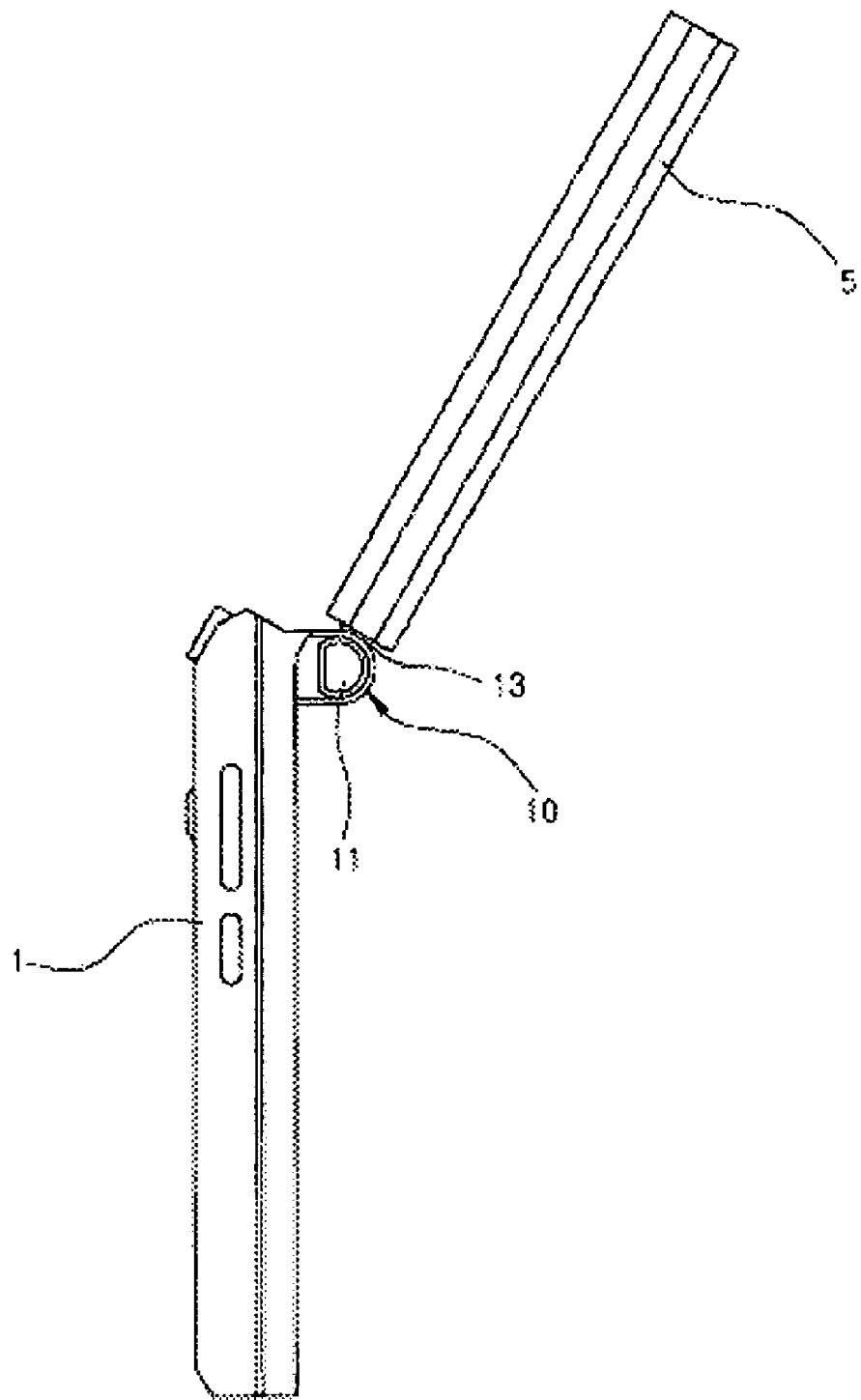

FIG. 2b
Conventional
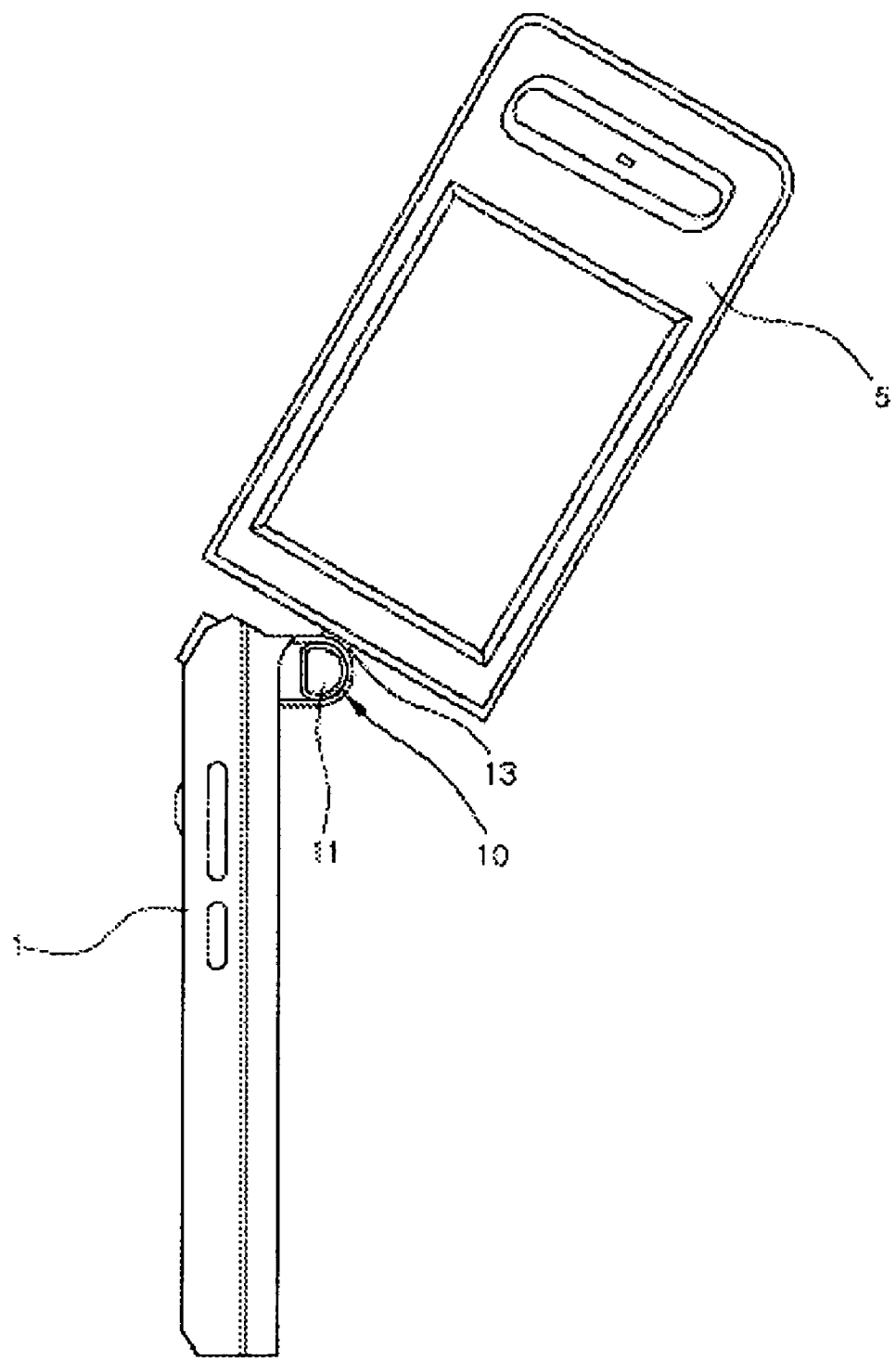

SWIVEL HINGE AND PORTABLE TERMINAL USING THE SAME

BACKGROUND OF THE INVENTION

1. Field of the Invention

The present invention relates to a portable terminal, and more particularly to a portable terminal having a hinge allowing a folder section to rotate.

2. Background of the Related Art

People generally use various functions of portable terminals while carrying them. Portable terminals include cellular phones, PDAs, smart phones and the like. Recently, portable terminals equipped with cameras have been produced. A portable terminal includes a swivel hinge to allow a folder section to rotate with respect to a main body section of the portable terminal in a state that the folder section is opened.

FIGS. 1-2b show a conventional portable terminal having a swivel hinge. As shown in FIGS. 1-2b, various parts including a main board are installed in a main body section 1. The main body section 1 is provided at a front surface thereof with a plurality of keys 3 for allowing a user to input various information.

A folder section 5 is connected to one end of the main body section 1. The folder section 5 is provided with a display screen 7 for displaying various kinds of information. The folder section 5 is coupled to the main body section 1 through a swivel hinge 10 so that the folder section 5 can be moved from an open position to a closed position, or vise versa, with respect to the main body section 1 while being rotated in a direction perpendicular to the moving direction.

The swivel hinge 10 includes a first hinge section 12 positioned between a pair of rotation guide members 11, which are integrally formed at both upper side ends of the main body section 1. The first hinge section 12 functions as a rotational center when the folder section 5 is moved from the closed position to the open position, or vice versa, with respect to the main body section 1. The first hinge section 12 is connected to the main body section 1.

FIG. 2a shows a side view of the conventional portable terminal when the folder section 5 is located in the open position with respect to the main body section 1. In addition, the swivel hinge 10 includes a second hinge section 13 provided at one side of the first hinge section 12 perpendicular to a length direction of the first hinge section 11. A rotational center line of the first hinge section 12 is perpendicular to a rotational center line of the second hinge section 13. The folder section 5 is connected to the second hinge section 13.

Accordingly, if the second hinge section 13 rotates with respect to the first hinge section 12, the folder section 5 is rotated in a left or a right direction of the main body section 1 when viewed from a front of the main body section 1. FIG. 2b shows the folder section 5 rotated in the left direction of the main body section 1.

Generally, when the folder section 5 moves or rotates about the first and second hinge sections 12 and 13 by a predetermined angle, the folder section 5 has been automatically shifted into a predetermined position with respect to the main body section 1. In particular, a spring (not shown) is installed to allow the first and second hinge sections 12 and 13 to elastically bias the folder section 5 towards the predetermined position, or a cam mechanism is adopted in the portable terminal.

As shown in FIG. 2a, the folder section 5 can be rotated from the main body section 1 by an angle of approximately 135°, or can be shifted into the closed position by applying elastic force of a spring to the folder section 5 utilizing a cam mechanism. Further, when the folder section 5 rotates by a predetermined angle, the folder section 5 is automatically shifted into predetermined positions as shown in FIGS. 2a and 2b.

However, as described above, the conventional portable terminal has various disadvantages. Since the spring and cam mechanism are used for automatically shifting the folder section 5 to the predetermined position when the folder section 5 rotates by the predetermined angle, the number of parts for the swivel hinge 10 is increased. Further, if the swivel hinge 10 is formed by using the conventional spring and cam mechanism, the elastic property of the spring may deteriorate or wear of the spring may occur when the swivel hinge 10 has been used for a long time, which lowers the reliability of the swivel hinge 10. In addition, the folder section 5 rotatably connected to the main body section 1 may interfere with the main body section 1 when the folder section 5 rotates when the folder section 5 is insufficiently opened. If the folder section 5 interferes with the main body section 1, the folder section 5 cannot easily rotate, and the main body section 1 and the folder section 5 may be damaged.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a swivel hinge having a structure that reduces a mechanical construction.

Another object of the present invention is to provide a swivel switch having increased reliability and endurance.

Another object of the present invention is to provide a folder-type portable terminal having a swivel hinge capable of preventing a folder section from interfering with a main body section.

Another object of the present invention is to provide a portable terminal having a swivel hinge rotating a folder section when the folder section is opened.

Another object of the present invention is to provide a portable terminal having a swivel hinge rotating a folder section when the folder section is opened using magnets.

In order to achieve at least the above objects and advantages in a whole or in part, in accordance with one aspect of the present invention there is provided a swivel hinge, that includes a first hinge section configured to rotate about a first hinge shaft, a second hinge section coupled to the first hinge section and configured to rotate about a second hinge shaft, wherein the second hinge shaft is substantially perpendicular to the first hinge shaft and first and second magnets correspondingly provided at first and second hinge sections, respectively, wherein a force is created between the first and second magnets when the first and second hinge sections are positioned in a predetermined relationship.

To further achieve at least the above objects in a whole or in part, in accordance with one aspect of the present invention there is provided a portable terminal that includes a first section, a second section coupled to one end of the first section and having a display, a first hinge section rotatably coupled to the first section, a second hinge section rotatably coupled to the second section, wherein the second hinge section is coupled to the first hinge section, and wherein the second hinge rotates in a direction different than the first hinge and first and second magnets provided at the first and second sections, respectively, wherein the first and second magnets operate to urge the first and second hinge sections to a position parallel to each other.

To further achieve at least the above objects in a whole or in part, in accordance with one aspect of the present invention there is provided a swivel hinge that includes a first hinge section configured to rotate about a first hinge shaft, a second hinge section coupled to the first hinge section and configured to rotate about a second hinge shaft, wherein the second hinge shaft extends in a direction perpendicular to the first hinge shaft and a stopper engagement section and stopper respectively provided at one of the second hinge sections to rotate together with the second hinge shaft and the first hinge section, wherein the stopper allows the second hinge section to freely rotate after the first hinge section has rotated by a predetermined angle around the first hinge shaft.

To further achieve at least the above objects in a whole or in part, in accordance with one aspect of the present invention there is provided a portable terminal that includes a main body section, a folder section coupled to the main body section and movable from an open position where the folder section is shifted away from the main body section to a closed position where the folder section is adjacent to the main body section, a first hinge section rotatably coupled to the main body section, a second hinge section coupled to the folder section, wherein the second hinge section is rotatably coupled to the first hinge section, and wherein the second hinge section rotates about a second hinge shaft extending in a direction substantially perpendicular to a first hinge shaft, a stopper engagement section provided along the second hinge shaft to rotate together with the second hinge shaft and a stopper configured to restrict movement of the stopper engagement section, wherein the stopper is fixed to the main body section to restrict the second hinge section from freely rotating until the first hinge section rotates by a predetermined angle from the closed position.

To further achieve at least the above objects in a whole or in part, in accordance with one aspect of the present invention there is provided a method of assembling a portable terminal that includes a providing a first hinge rotatably coupled to a main body, providing a second hinge connected to a display body and rotatably coupled to the first hinge, wherein the second hinge rotates in a direction different than the first hinge, providing a stopper engagement section and stopper respectively on the first and second hinges, wherein the stopper allows the second hinge to freely rotate after the first hinge has rotated by a prescribed angle from a closed position and providing first and second magnets respectively on the first and second hinges, wherein the first and second magnets operate to urge the first and second hinge sections to a position parallel to each other when the second hinge freely rotates.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 is a diagram showing a perspective view of a portable terminal having a conventional swivel hinge;

FIG. 2a is a diagram showing a side view of a portable terminal having a conventional swivel hinge in which a folder section is located in an open position;

FIG. 2b is a diagram showing a side view of a portable terminal having a conventional swivel hinge in which a display section is rotated;

FIG. 7b is a diagram showing a front view of the swivel hinge shown in FIG. 7a;

DETAILED DESCRIPTION OF PREFERRED EMBODIMENTS

Figure 3:
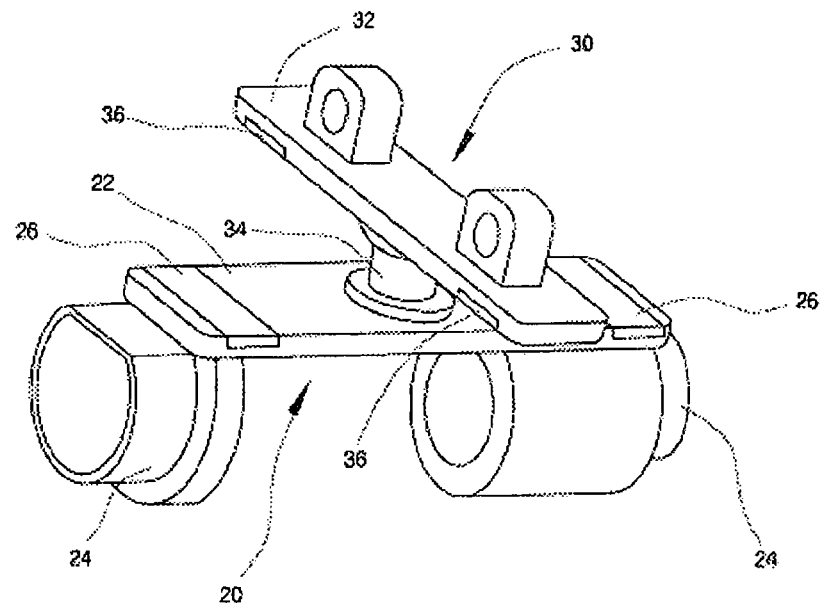
FIG. 3 is a diagram showing a perspective view of a swivel hinge according to one embodiment of the present invention.

Embodiments of a swivel hinge, methods for using same and portable terminals having a swivel hinge according to the present invention will now be described. FIG. 3 is a diagram that shows a swivel hinge according to one embodiment of the present invention. The swivel hinge of FIG. 3, for example, can be used in a portable terminal.

As shown in FIG. 3, the swivel hinge can include a first hinge section 20 and a second hinge section 30. Members of the portable terminal performing a relative rotating action using the swivel hinge (e.g., a main body section and a folder section) can be respectively coupled to the first and second hinge sections 20 and 30. The first hinge section 20 can be rotatably installed at a rotational center of the main body section.

The first hinge section 20 can have a body plate 22 provided at both sides thereof with a first hinge shaft 24. The body plate 22 can rotate together with the first hinge shaft 24, so it is preferable to integrally fabricate the body plate 22 with the first hinge shaft 24. However, it is also possible to fabricate the hinge shaft 24 and the body plate 22 separately. In addition, although the first hinge shaft 24 is illustrated as a cylindrical shape, embodiments of the present invention do not limit the shape of the first hinge shaft 24 so long as the first hinge shaft can rotate about a rotational center.

The body plate 22 can include a first magnet 26 at both ends, respectively. The first magnet 26 can be positioned on the body plate 22 with various structural patterns. Although FIG. 3 shows the first magnet 26 inserted into a slot formed on the body plate 22 without protruding from the body plate 22, the present invention is not intended to be so limited. For example, the first magnet 26 can be installed on the body plate 22 while protruding from an upper surface of the body plate 22 or the like. In addition, it is also possible to form a predetermined portion of the body plate 22 as the first magnet 26 by magnetizing the predetermined portion of the body plate 22.

The second hinge section 30 can include a connecting plate 32. The connecting plate 32 is preferably coupled to one of members of the portable terminal, which can be rotated relative to each other by means of the swivel hinge. For example, the connecting plate 32 can be coupled to the folder section of the portable terminal.

The connecting plate 32 of the second hinge section 30 can include a second hinge shaft 34. The second hinge shaft 34 is rotatably coupled to the body plate 22 of the first hinge section 20. An imaginary rotational center line of the second hinge shaft 34 is preferably perpendicular to an imaginary rotational center line of the first hinge shaft 24.

The connecting plate 32 can include a second magnet 36 at both ends, respectively. The second magnet 36 can be positioned on the connecting plate 32 such that the second magnet 36 faces the body plate 22. The second magnet 36 preferably has a polarity opposite to a polarity of the first magnet 26 formed on the body plate 22. For example, if the first magnet 26 has an N-pole, the second magnet 36 has an S-pole. Thus, attractive force can be created between the first and second magnets 26 and 36.

Figure 4A:
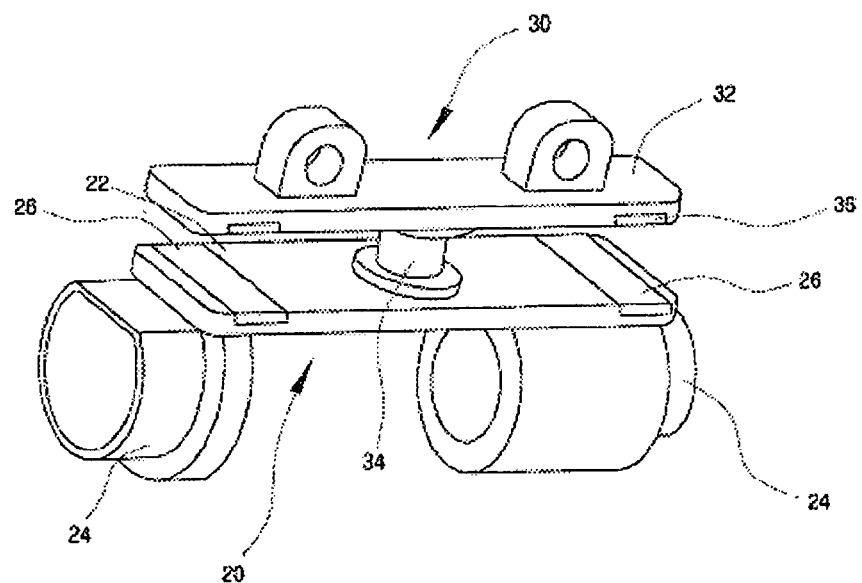
FIGS. 4a to 4e are diagrams showing operational states of a swivel hinge according to one embodiment of the present invention.

As shown in FIG. 4a, the connecting plate 32 and the body plate 22 rotated about the second hinge shaft 34 can be positioned in parallel to each other because of attractive force between the first and second magnets 26 and 36. Preferably, the first magnet 26 of the body plate 22 and the second magnet 36 of the connecting plate 32 are located at positions, which are farthest from the second hinge shaft 34.

Figure 5:
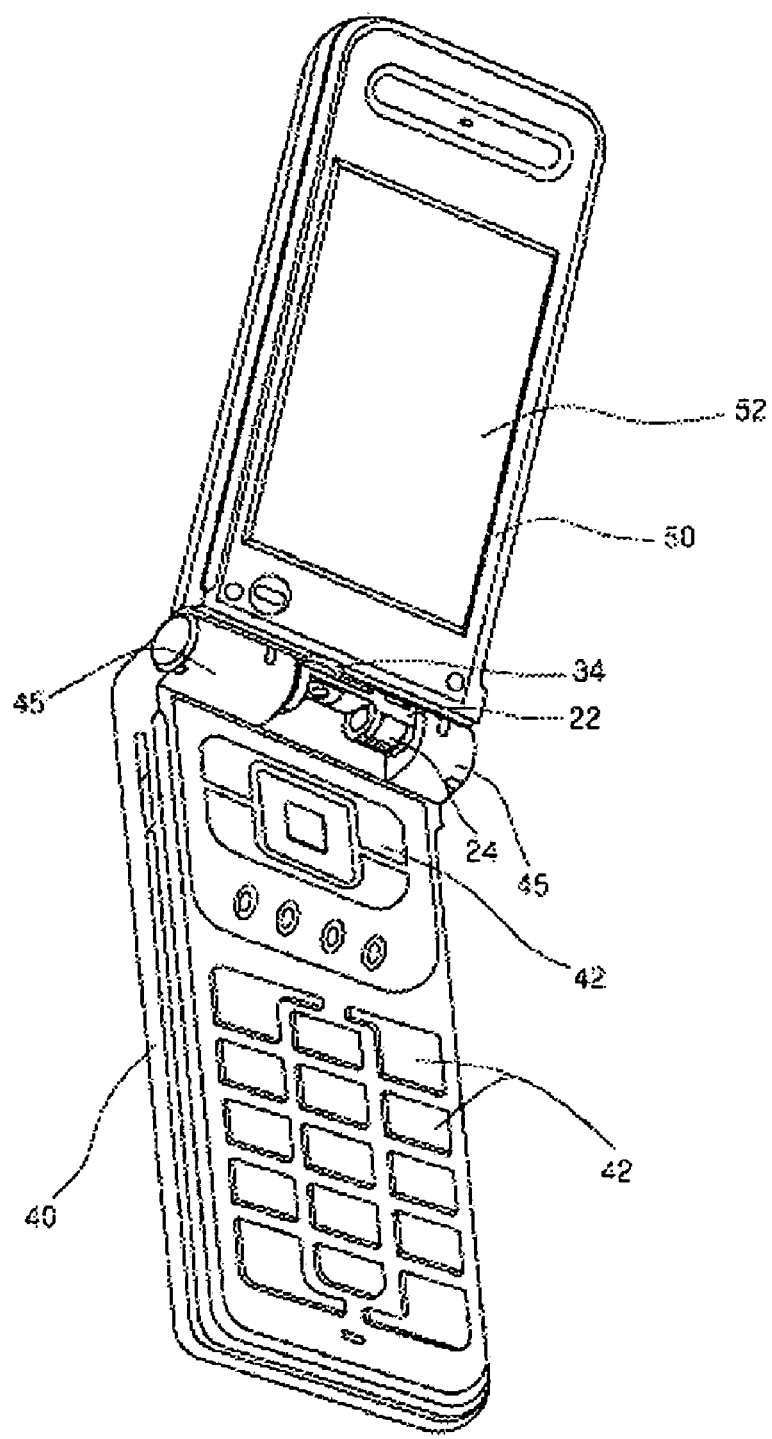
FIG. 5 is a diagram showing a partially sectional perspective view of a portable terminal having a swivel according to one embodiment of the present invention.

An embodiment of a portable terminal equipped with the swivel hinge of FIG. 3 will be described. As shown in FIG. 5, the portable terminal can include a main body section 40 and a folder section 50, which can be coupled to each other by means of the swivel hinge. The folder section 50 can rotate about the first hinge shaft 24 with respect to the main body section 50. That is, the folder section 50 is movable from a closed position, in which the folder section 50 is overlapped with the main body section 40, to an open position, in which the folder section 50 is shifted away from the main body section 40, or vice versa. In addition, when viewed from a front of the main body section 40, the folder section 50 can rotate in directions left or right relative to the main body section 40 about the second hinge shaft 34.

A plurality of keys 42 are provided at a front surface of the main body section 40. In addition, a pair of rotation guide members 45 can be provided at both upper side ends of the main body section 40. However, the present invention is not intended to be so limited. The first hinge shaft 24 provided at both ends of the body plate 22 can be inserted into the rotation guide members 45. To this end, each of the rotation guide members 45 preferably has a corresponding form such as a cylindrical cavity therein as illustrated.

In addition, a display screen 52 is provided in the folder section 50 for displaying various kinds of information. The folder section 50 can be coupled to the connecting plate 32 of the second hinge section 30. Accordingly, the folder section 50 is preferably integrally operated with the connecting plate 32. That is, the folder section 50 not only moves from the closed position to the open position, or vice versa, with respect to the main body section 40 about the first hinge shaft 24, but also can rotate in directions left or right relative to the main body section 40 about the second hinge shaft 34.

As described above, the body plate 22 and the connecting plate 32 of the swivel hinge, which couples the main body section 40 to the folder section 50, can be provided at both ends thereof with first and second magnets 26 and 36, respectively. Accordingly, when the folder section 50 rotates in directions left or right relative to the main body section 40, the first and second magnets 26 and 36 allow the folder section 50 to be urged toward or stopped at a predetermined position with respect to the main body section 40. For example, a predetermined position can be the body plate and the connecting plate parallel or perpendicular to each other.

Operations of the swivel hinge of FIG. 3 and a portable terminal having the swivel hinge will now be described. Various positions of the swivel hinge of FIG. 3 are shown in FIGS. 4a-4e.

FIG. 4a shows a state of the swivel hinge when the folder section 50 is not rotated with respect to the main body section 40 as shown in FIG. 5. Thus, strong attractive force can be created between the first and second magnets 26 and 36.

Figure 4B:
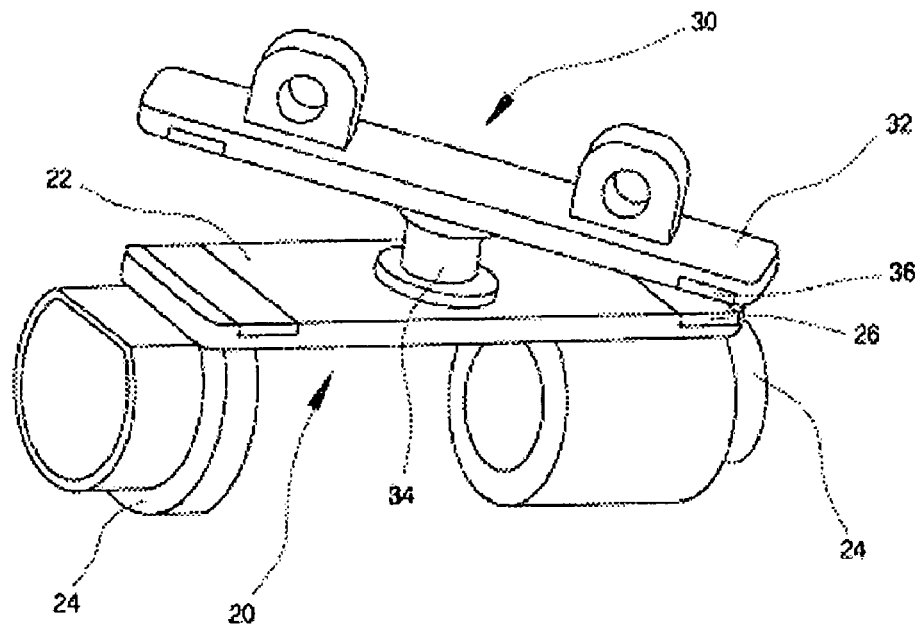

FIG. 4b shows a state of the swivel hinge when a user slightly rotates the folder section 50 in the right or the left direction of the main body section 40. That is, the folder section 50 can rotate with respect to the main body section 40 about the second hinge shaft 34. Accordingly, attractive force between the first and second magnets 26 and 36 can decrease and become weak. In this state, if the folder section 50 further rotates, an attractive force reduced to a minimum or does not occur between first and second magnets 26 and 36.

Figure 4C:
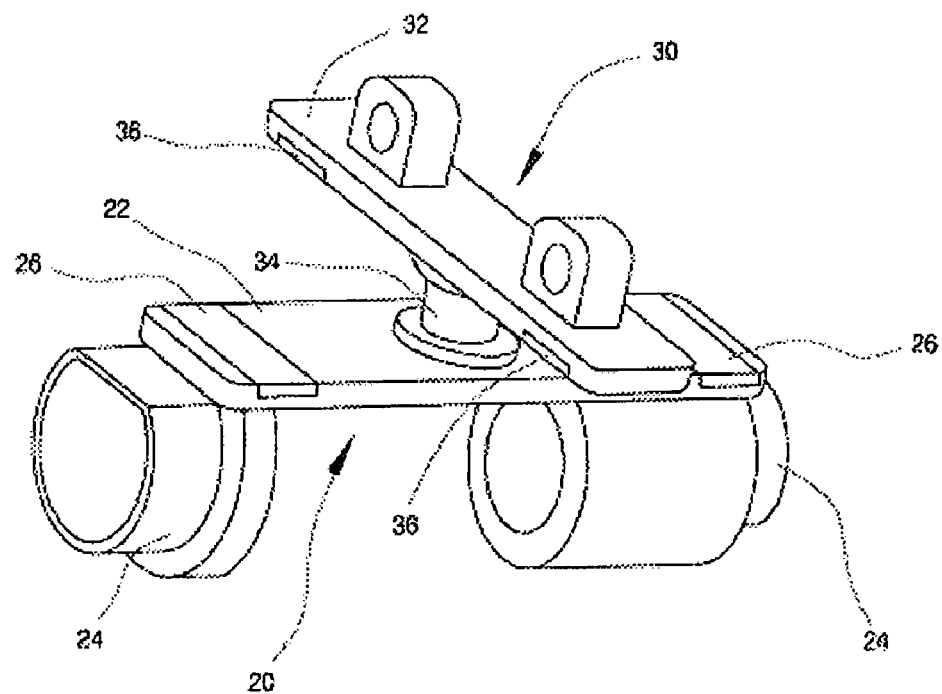

FIG. 4c shows a state of the swivel hinge when the folder section 50 rotates at a right angle with respect to the main body section 40. At this time, the body plate 22 is positioned perpendicular to the connecting plate 32.

Figure 4D:
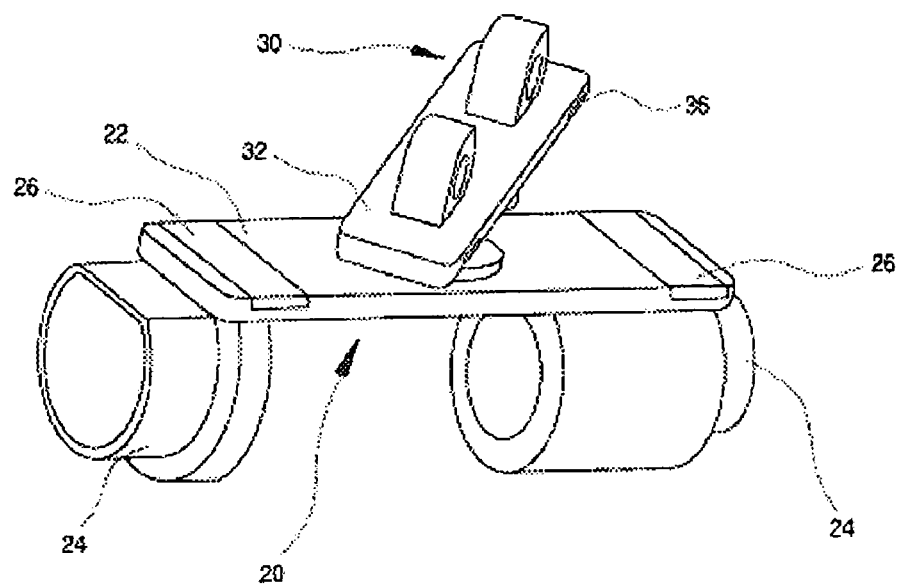

As shown in FIG. 4c, if the user further rotates the folder section 50 in the same direction (e.g., as shown in FIG. 4d) the first hinge section 20 and the second hinge section 30 rotate about the second hinge shaft 34, so the main body section 40 and the folder section 50 also rotate about the second hinge shaft 34. In addition, when the first magnet 26 is adjacent to the second magnet 36 because of the rotation of the folder section 50, attractive force can be created between the first and second magnets 26 and 36.

Figure 4E:
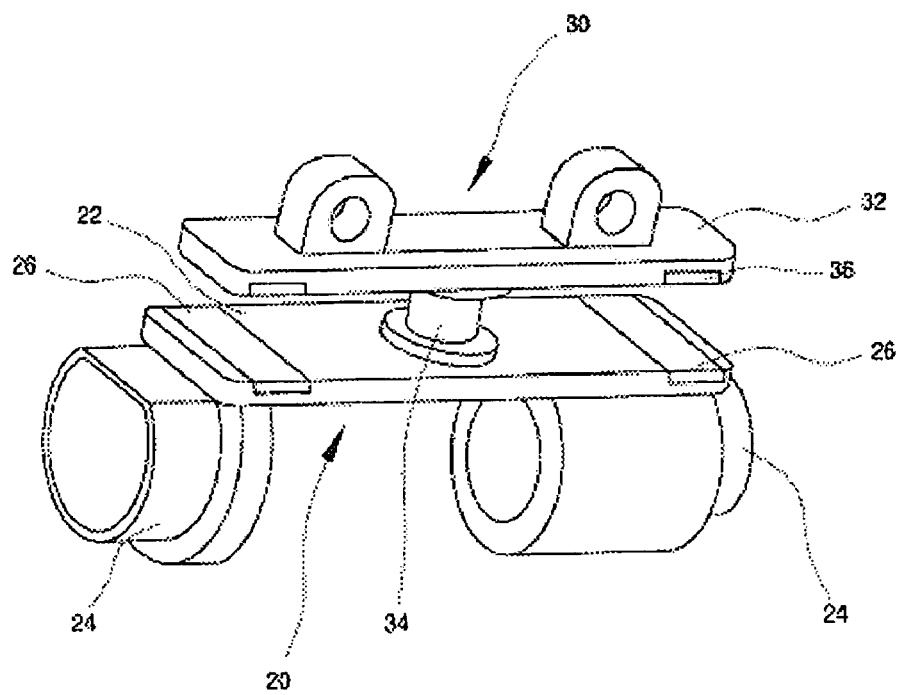

As shown in FIGS. 4c and 4d, if the folder section 50 further rotates, the first magnet 26 and the second magnet 36 can be aligned in parallel (e.g., as shown in FIG. 4e) because of attractive force between the first and second magnets 26 and 36 even if the user does not apply external force to the folder section 50. That is, the relative position between the main body section 40 and the folder section 50 can be determined by means of the first and second magnets 26 and 36.

Figure 6:
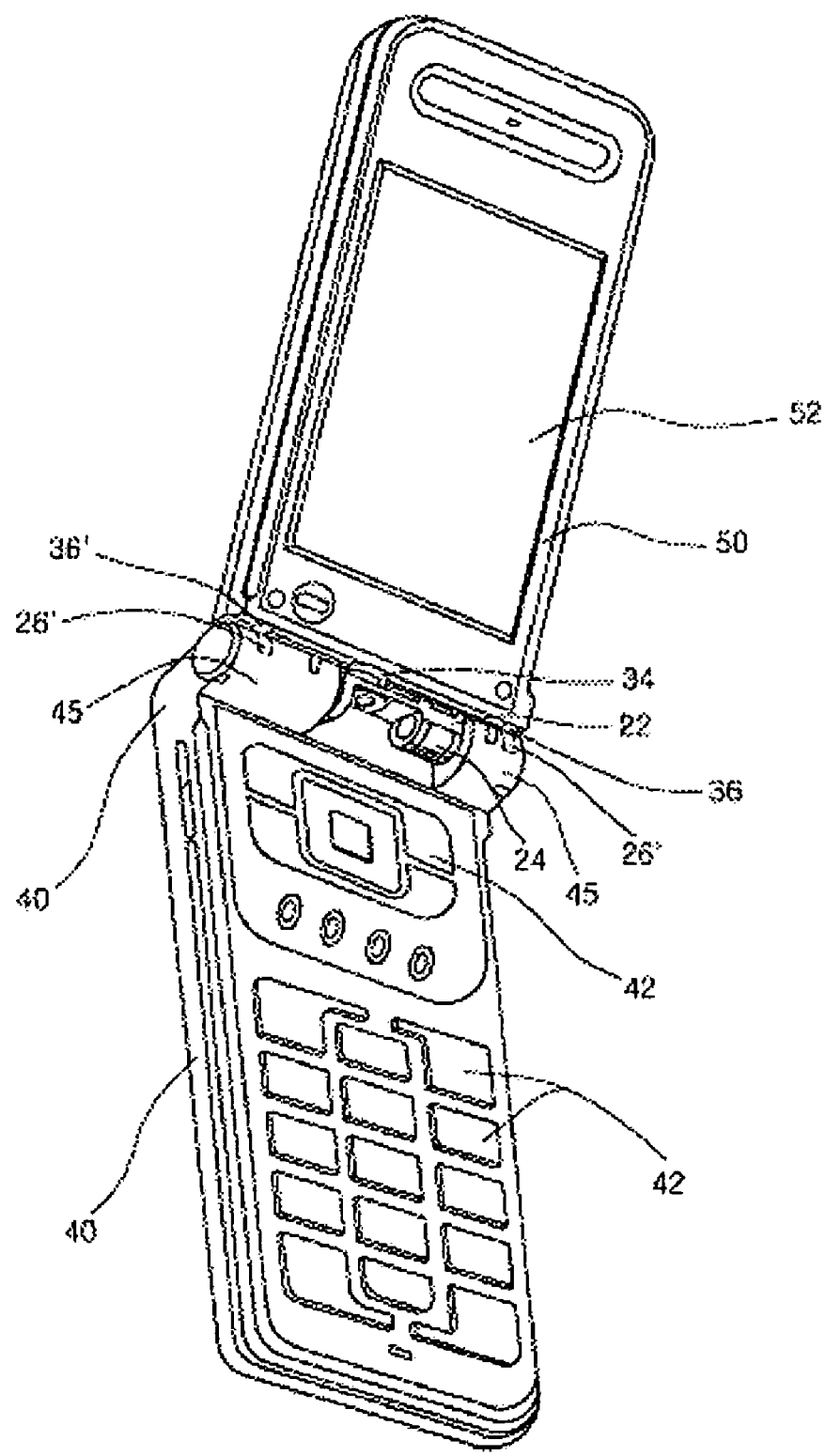
FIG. 6 is a diagram showing a partially sectional perspective view of a portable terminal having a swivel according to another embodiment of the present invention.

FIG. 6 is a diagram that shows a portable terminal according to another embodiment of the present invention. As shown in FIG. 6, in order to allow the folder section 50 to be stopped at a predetermined position with respect to the main body section 40, at least one first magnet 26' can be installed at upper side ends of the main body section 40 and at least one second magnet 36' can be installed at lower side ends of the folder section 50 corresponding to the first magnets 26'.

That is, as shown in FIG. 6, the first magnets 26' can be installed at side ends of the rotation guide members 45 and the second magnets 36 can be installed at lower side ends of the folder section 50 corresponding to the first magnets 26'. However, the present invention is not intended to be so limited. For example, it is also possible to install the first and second magnets 26' and 36' on the body plate 22 and the connecting plates 32 by extending the body plate 22 and the connecting plates 32 to the installation positions of the first and second magnets 26' and 36' shown in FIG. 6. Further, the first and second magnets 26' and 36' can be installed on the main body section 40, the folder section 50, the body plate 22 and the connection plate 32 and combinations thereof.

Figure 7A:
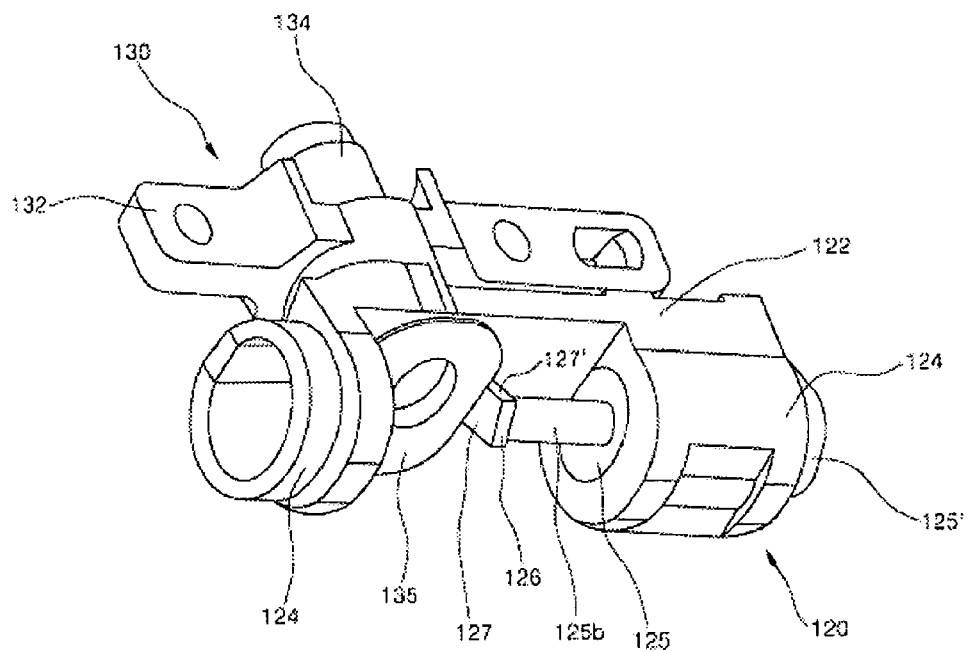
FIG. 7a is a diagram showing a perspective view of a swivel hinge according to yet another embodiment of the present invention.
Figure 7B:
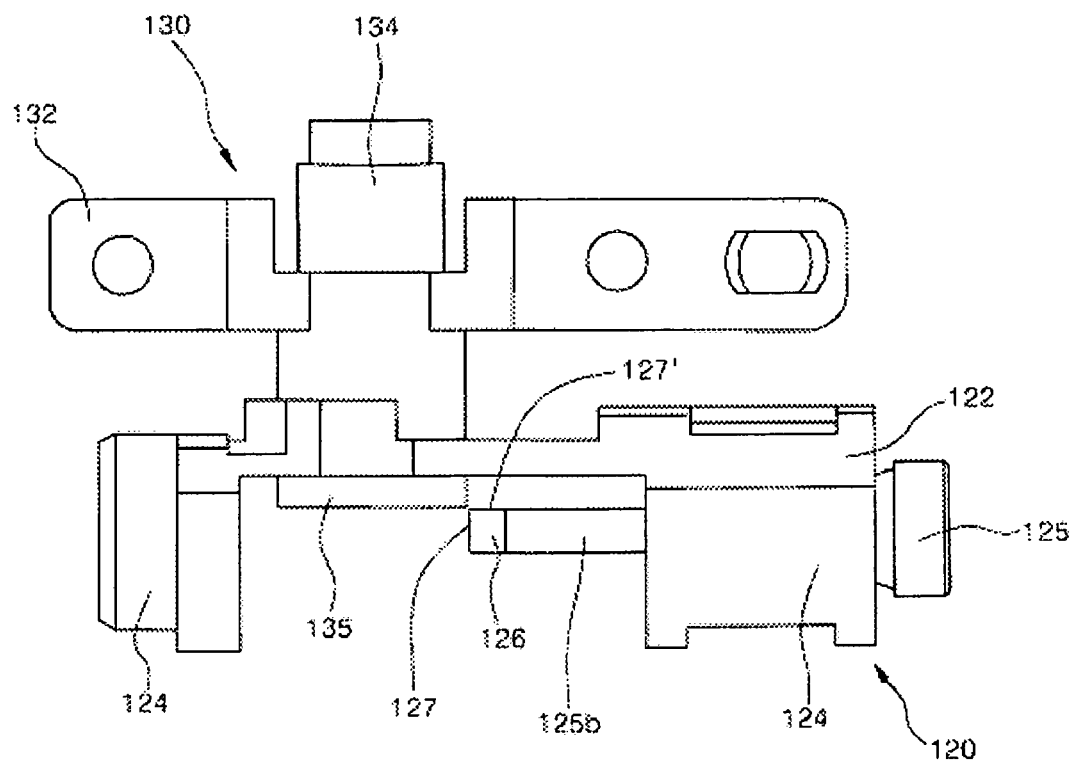

FIGS. 7a and 7b show a swivel hinge according to yet another embodiment of the present invention. As shown in FIGS. 7a and 7b, the swivel hinge can mainly include a first hinge section 120 and a second hinge section 130. Members of the portable terminal that can perform a relative rotating action using the swivel hinge of FIG. 7a, such as a main body section and a folder section, can be coupled to the first and second hinge sections 120 and 130. The first hinge section 120 can be rotatably installed at a rotational center of the main body section.

The first hinge section 120 can have a body plate 122 provided at both sides thereof with a first hinge shaft 124, respectively. The body plate 122 can rotate together with the first hinge shaft 124, so it is preferable to integrally fabricate the body plate 122 with the first hinge shaft 124. However, it is also possible to separately fabricate the hinge shaft 124 from the body plate 122. In addition, although the first hinge shaft 124 is illustrated as a cylindrical shape, embodiments of the present invention do not limit the shape of the first hinge shaft 124 so long as the first hinge shaft can rotate about a rotational center.

A click hinge 125 can be provided while passing through a center of the first hinge shaft 124. The click hinge 125 adjusts an opening degree of a part fixed to a connecting plate 132. The click hinge 125 can include a cam and a spring.

A stopper 126 can be provided while passing through the click hinge 125. The stopper 126 can be positioned along (e.g., at one end) a central shaft 125b of the click hinge 125 and coupled to a fixing member 125' provided along (e.g., at the other end) the click hinge 125 through the central shaft 125b. Since the stopper 126 can be fixed by means of the fixing member 125', the stopper 126 preferably does not rotate. The stopper 126 can have an elongated plate shape. However, embodiments of the present invention do not limit the shape of the stopper 126. The stopper 126 can include a front surface 127 corresponding to a locking surface 136 of a stopper engagement plate 135 and a guide surface 127' that can be formed at an angle (e.g., a right angle) with respect to the front surface 127. The guide surface 127' can extend in a predetermined direction in order to reduce or limit a rotational range of the stopper engagement plate 135.

The second hinge section 130 can include the connecting plate 132. The connecting plate 132 can be coupled to one of members of the portable terminal, which can be relatively rotated by means of the swivel hinge. For example, the connecting plate 132 can be connected to the folder section of the portable terminal.

The connecting plate 132 of the second hinge section 130 preferably has a second hinge shaft 134. The second hinge shaft 134 can be rotatably coupled to the body plate 122 of the first hinge section 120. An imaginary rotational center line of the second hinge shaft 134 is preferably perpendicular to an imaginary rotational center line of the first hinge shaft 124.

The stopper engagement plate 135 can be provided along (e.g., at one end) the second hinge shaft 134 adjacent to the first hinge shaft 124. The stopper engagement plate 135 can have a substantially circular plate shape formed at a center thereof with a perforation hole. However, embodiments of the present invention do not limit a shape of the stopper engagement plate 135.

Figure 8:
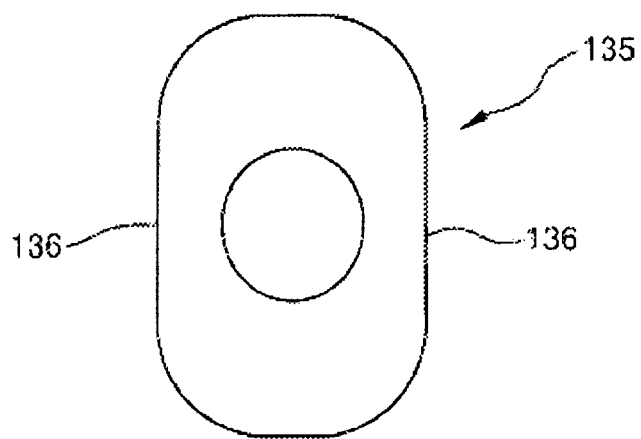
FIG. 8 is a diagram showing a bottom view of an engagement plate according to yet another embodiment of the present invention.

As shown in FIG. 8, the stopper engagement plate 135 can be formed at both side ends thereof with locking surfaces 136. The locking surfaces 136 can be formed by cutting both sides of the stopper engagement plate 135. Preferably, the locking surfaces 136 are symmetrically formed at both sides of the stopper engagement plate 135. In a selected position (e.g., closed), the locking surfaces 136 can face the front surface 127 of the stopper 126 in order to prevent the stopper engagement plate 135 from being rotated.

Figure 10:
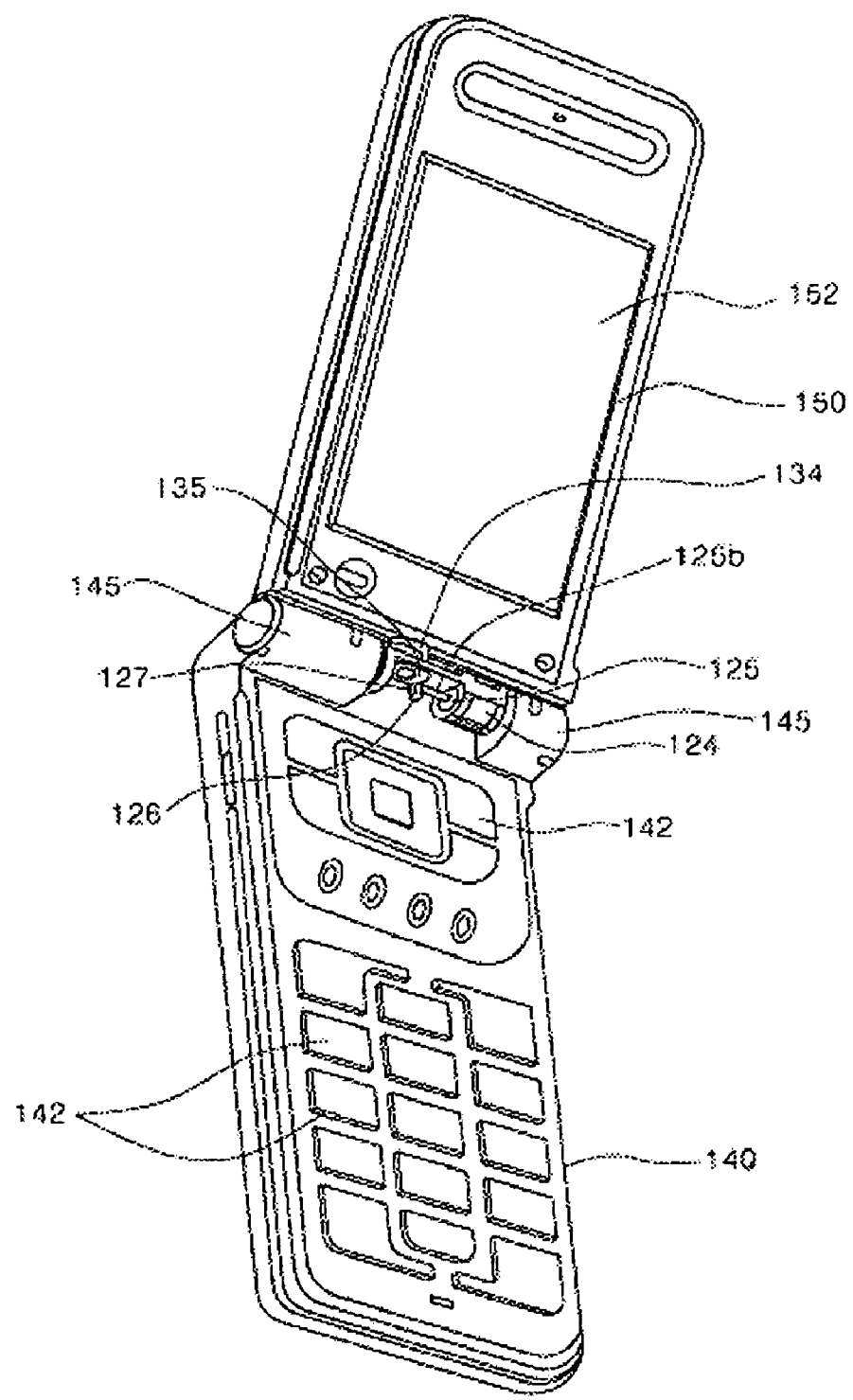
FIG. 10 is a diagram showing a partially sectional perspective view of a folder-type portable terminal according to yet another embodiment of the present invention.

FIG. 10 shows an embodiment of a portable terminal equipped with the swivel hinge of FIG. 7a. As shown in FIG. 10, the portable terminal can include a main body section 140 and a folder section 150, which can be coupled to each other by means of the swivel hinge. The folder section 150 can rotate about the first hinge shaft 124 with respect to the main body section 150. That is, the folder section 150 is movable from a closed position, in which the folder section 150 is overlapped with the main body section 140, to an open position, in which the folder section 150 is shifted away from the main body section 140, or vice versa. In addition, when viewed from a front of the main body section 140, the folder section 150 can rotate in a left or a right direction of the main body section 140 about the second hinge shaft 134.

A plurality of keys 142 are provided at a front surface of the main body section 140. In addition, a pair of rotation guide members 145 can be provided at both upper side ends of the main body section 140. However, the present invention is not intended to be so limited. The first hinge shaft 124 provided at both ends of the body plate 122 can be inserted into the rotation guide members 145. To this end, the rotation guide members 145 preferably have a corresponding form such as a cylindrical cavity therein as illustrated.

In addition, a display screen 152 is provided in the folder section 150 for displaying various kinds of information. The folder section 150 can be coupled to the connecting plate 132 of the second hinge section 130. Accordingly, the folder section 150 is preferably integrally operated with the connecting plate 132. That is, the folder section 150 not only moves from the closed position to the open position, or vice versa, with respect to the main body section 140 about the first hinge shaft 124, but also can rotate in the left or the right direction of the main body section 140 about the second hinge shaft 134.

The stopper 126 can be provided at an end of the click hinge 125 formed by passing through the first hinge shaft 124 of the first hinge section 120. The guide surface 127' of the stopper 126 can be parallel to an upper surface of the main body section 140. That is, the stopper 126 can extend in parallel to the upper surface of the main body section 140. The stopper 126 can be fixed to the main body section 140 by means of the fixing member 125' or the like.

The stopper engagement plate 135 can be provided near or at one end of the second hinge shaft 134. One of the locking surfaces 136 of the stopper engagement plate 135 is preferably positioned corresponding to the front surface 127 of the stopper 126 until the folder section 150 is opened by a predetermined angular degree. When the folder section 130 is opened exceeding the predetermined angular degree, the locking surface 136 can be shifted to a predetermined position corresponding to an upper portion of the guide surface 127'.

Operations of the swivel hinge and a folder-type portable terminal having the swivel hinge according to the present invention will now be described. Various positions of the swivel hinge of FIGS. 7a-7b are shown in FIGS. 9a to 9c.

Figure 9A:
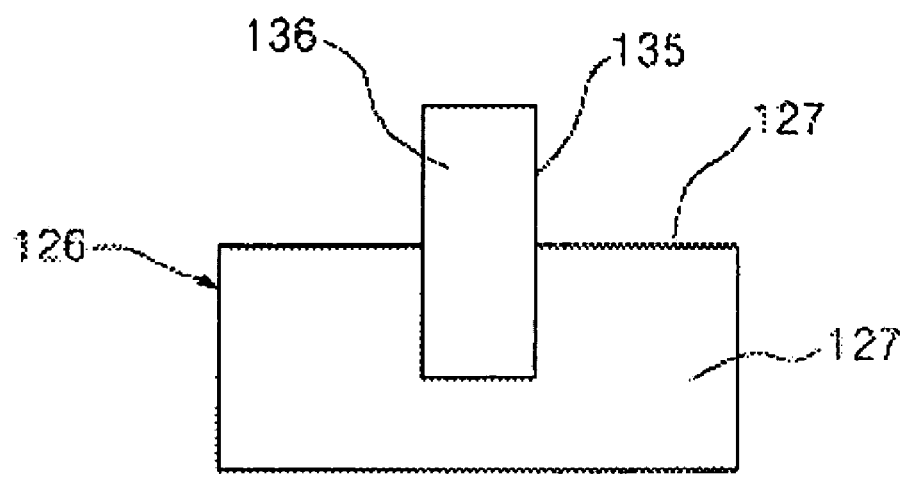
FIGS. 9a to 9c are diagrams showing a relationship between a folder section and a stopper depending on an opening degree of the folder section.
Figure 9A:
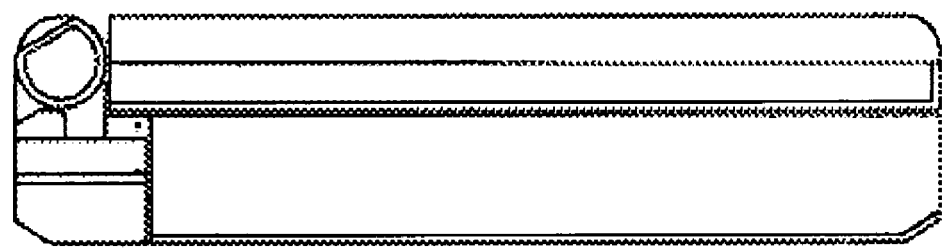

FIG. 9a shows a state of the folder-type portable terminal when the folder section 150 is in the closed position with respect to the main body section 140. At this time, the locking surfaces 136 of the stopper engagement plate 135 can face the front surface 127 of the stopper 126. When viewed from a side of the folder-type portable terminal, the locking surfaces 136 of the stopper engagement plate 135 are perpendicularly formed with respect to the stopper 126. However, the present invention is not intended to be so limited.

Accordingly, the locking surfaces 136 of the stopper engagement plate 135 make contact with the front surface 127 of the stopper 126, so that the stopper plate 135 does not rotate. In other word, the second hinge section 130 does not rotate with respect to the first hinge section 120. That is, the folder section 150 does not rotate with respect to the main body section 140.

Figure 9B:
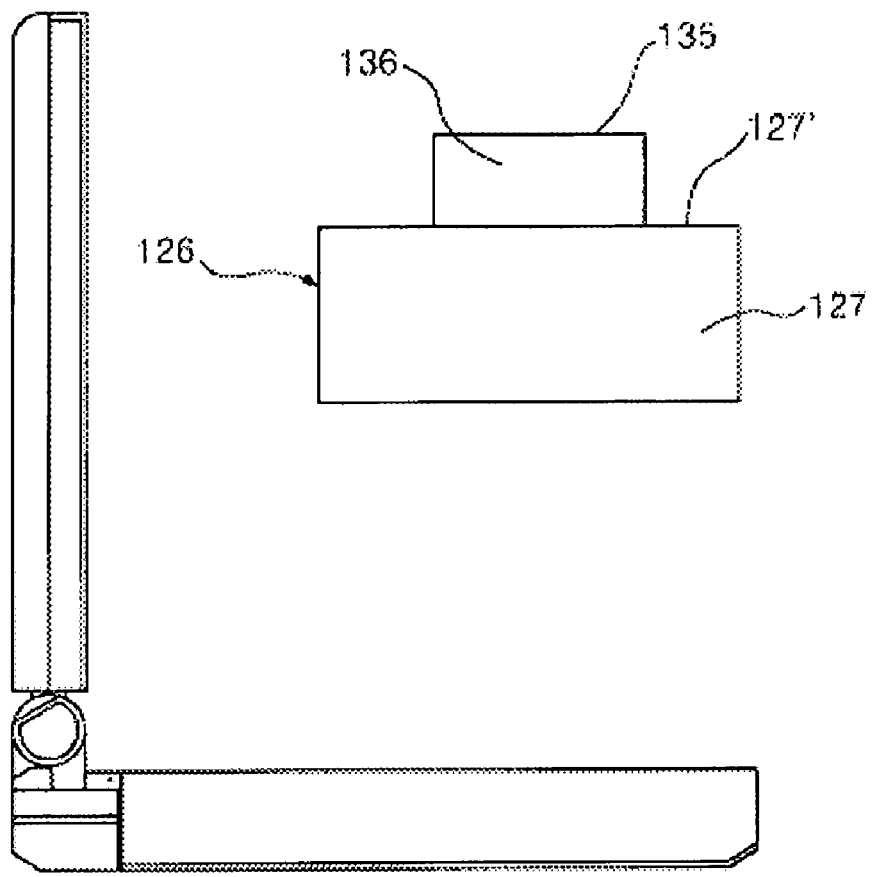
Figure 9C:
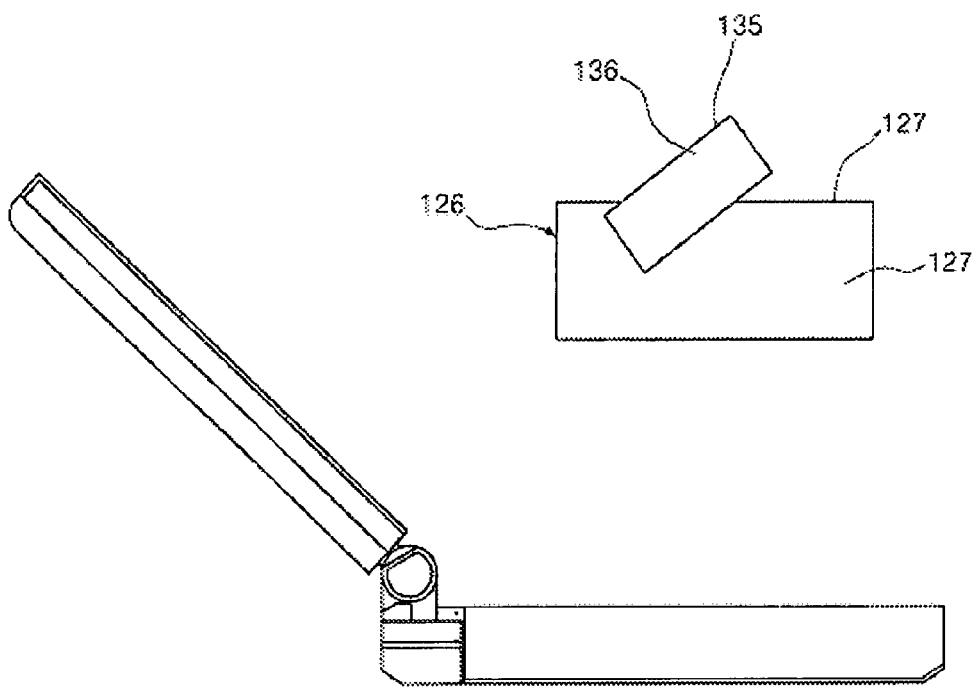

FIG. 9b shows a state of the folder-type portable terminal when the folder section 150 rotates at a right angle with respect to the main body section 140. At this time, the locking surfaces 136 of the stopper engagement plate 135 preferably do not face the front surface 127 of the stopper 126. For example, a lower surface of the stopper engagement plate 135 does not face the guide surface 127' of the stopper because of rotation of the stopper engagement plate 135. That is, the stopper engagement plate 135 can rotate regardless of the stopper 126. In the state shown in FIG. 9b, the folder section 150 can rotate with respect to the main body section 140.

FIG. 9c shows a state of the folder-type portable terminal when the folder section 150 rotates greater than the right angle with respect to the main body section 140. The folder section 150 can be formed such that it is opened with respect to the main body section 140 at a predetermined angle. The predetermined angle can vary depending on sorts, types or models of portable terminals and design conditions thereof. The predetermined angle can be in a range, for example, of about 135 to 150 degrees.

In the state shown in FIG. 9c, the locking surfaces 136 of the stopper engagement plate 135 can make contact with the front surface 127 of the stopper 126. Thus, as shown in FIG. 9c, the folder section 150 does not rotate with respect to the main body section 140.

Figure 11:
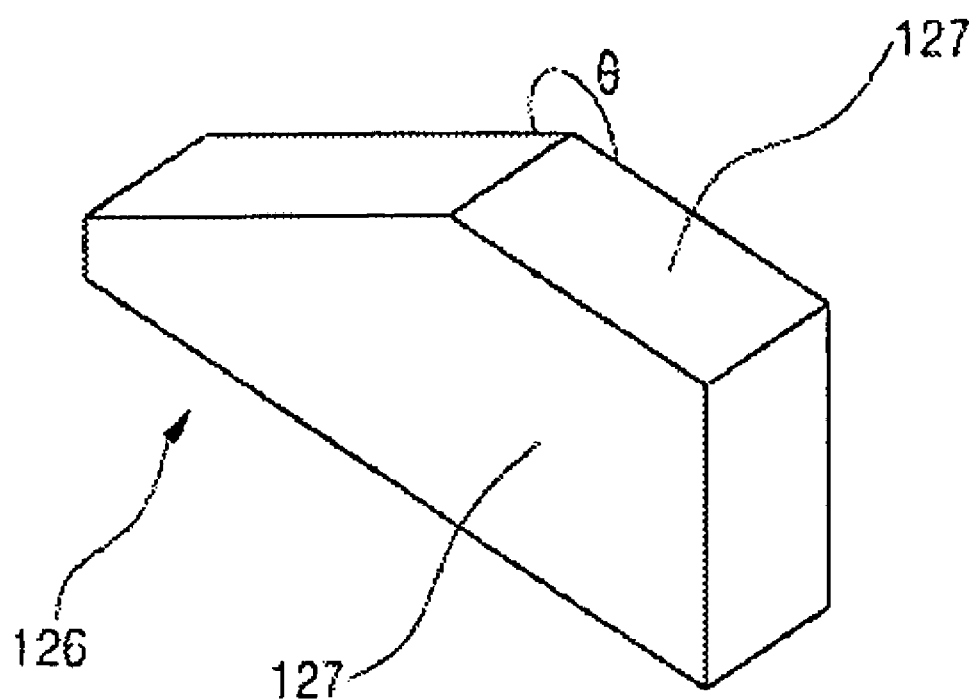
FIG. 11 is a diagram showing a perspective view of a stopper according to still yet another embodiment of the present invention.

FIG. 11 shows yet another embodiment of a swivel hinge according to the present invention. The embodiment of FIG. 11 is similar to the embodiment of FIGS. 7a-7b. However, as shown in FIG. 11, in order to allow the folder section 150 to rotate about the second hinge shaft 134 when the folder section 150 has been rotated beyond a right angle with respect to the main body section 140, the guide surface 127' of the stopper 126 can be formed in such a manner that an angle (θ) between both ends of the guide surface 127' about a center line thereof exceeds 180°. For example, in order to open the folder section 150 by 135° with respect to the main body section 140, the angle (θ) between both ends of the guide surface 127' can be formed at 225°. As shown in FIG. 11, a lower portion of the guide surface 127' forwarding the lower portion of the main body section 140 can form a horizontal surface, and the remaining part of the guide surface 127' can form an inclined surface. For the stopper 126 as shown in FIG. 11, the folder section 150 can rotate about the second hinge 134 even if the folder section 150 is opened at 90°, or more than 90°, with respect to the main body section 140.

Any reference in this specification to "an embodiment," "another embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, according to the present invention, embodiments of a swivel hinge, methods for using same and portable terminals using same have various advantages. According to embodiments of the present invention, a structure of a swivel hinge for facilitating the rotational movement (e.g., of the folder section) can be simplified, so an assembling work thereof can be easily and simply carried out. Further, engagement structures between mechanical parts of the swivel hinge can be reduced or minimized and wear on mechanical parts can be reduced. Thus, endurance and reliability of the swivel hinge and the portable terminal having the swivel hinge can be improved. In addition, the folder section can be rotated in the left or the right direction of the main body section only when the folder section is opened by a predetermined angle with respect to the main body section. Accordingly, the folder section can rotate with respect to the main body section without interfering with the main body section. Thus, damage to the portable terminal caused by the interference between the folder section and the main body section can be reduced or prevented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A swivel hinge, comprising:
   a first hinge section configured to rotate about a first hinge shaft;
   a second hinge section coupled to the first hinge section and configured to rotate about a second hinge shaft, wherein the second hinge shaft is substantially perpendicular to the first hinge shaft;
   first and second magnets correspondingly provided at the first and second hinge sections, respectively, wherein a force is created between the first and second magnets when the first and second hinge sections are positioned in a predetermined relationship;
a stopper engagement section provided at the second hinge section to rotate together with the second hinge shaft; and
a stopper provided at the first hinge section, wherein the stopper prevents rotation of the second hinge section but allows the second hinge section to rotate after the first hinge section has rotated by a predetermined angle around the first hinge shaft.

2. The swivel hinge of claim 1, wherein the predetermined relationship is positioned parallel to each other.

3. The swivel hinge of claim 1, wherein the second hinge section is rotatably installed at one side of the first hinge section, and wherein the second hinge shaft is moved together with the first hinge section when the first hinge section rotates about the first hinge shaft.

4. The swivel hinge of claim 1, wherein the first magnets are located on both opposite ends of the first hinge section at positions spaced apart from the second hinge shaft, and wherein the second magnets are located on both opposite ends of the second hinge section at positions spaced apart from the second hinge shaft.

5. The swivel hinge of claim 1, wherein the first magnet comprises a first plurality of magnets and two or more magnets are installed at each end of the first hinge section and the second magnet comprises a second plurality of magnets and two or more magnets are installed at each end of the second hinge section.

6. The swivel hinge of claim 1, wherein the first magnet is formed at opposite end portions of a body plate of the first hinge section and the second magnet is formed at opposite side portions of a connecting plate of the second hinge section by magnetizing the portions of the body plate and the connecting plate, respectively.

7. A portable terminal comprising:
a first section;
a second section coupled to one end of the first section and having a display;
a first hinge section rotatably coupled to the first section;
a second hinge section rotatably coupled to the second section, wherein the second hinge section is coupled to the first hinge section, and wherein the second hinge rotates in a direction different than the first hinge;
first and second magnets provided at the first and second sections, respectively, wherein the first and second magnets operate to urge the first and second hinge sections to a position parallel to each other;
a stopper engagement section provided at the second hinge section to rotate together with the second hinge shaft; and
a stopper provided at the first hinge section, wherein the stopper prevents rotation of the second hinge section but allows the second hinge section to rotate after the first hinge section has rotated by a predetermined angle around the first hinge shaft.

8. The portable terminal of claim 7, wherein an attractive force is created between the first and second magnets when the first and second hinge sections are positioned in parallel to each other.

9. The portable terminal of claim 7, wherein the first magnet comprises a first plurality of magnets and two or more magnets are installed at both lateral edges of an upper side of the first section and the second magnet comprises a second plurality of magnets and two or more magnets are installed at both lateral edges of a lower side of the second section corresponding to the first magnets.

10. The portable terminal of claim 7, wherein the second hinge section is rotatably installed at one side of the first hinge section, and wherein the second hinge section is rotated together with the first hinge section when the first hinge section rotates about a first hinge axis.

11. The portable terminal of claim 7, wherein the first magnets are located on both opposite ends of the first hinge section at positions spaced apart from a second hinge shaft, and wherein the second magnets are located on both opposite ends of the second hinge section at positions spaced apart from the second hinge shaft.

12. The portable terminal of claim 7, wherein the first magnets are formed at opposite end portions of a body plate of the first hinge section and the second magnets are formed at opposite end portions of a connecting plate of the second hinge section by magnetizing the portions of the body plate and the connecting plate, respectively.

13. The portable terminal of claim 7, wherein the direction of rotation of the second hinge is substantially perpendicular to the first hinge rotation.

14. A swivel hinge comprising:
a first hinge section configured to rotate about a first hinge shaft;
a second hinge section coupled to the first hinge section and configured to rotate about a second hinge shaft, wherein the second hinge shaft extends in a direction perpendicular to the first hinge shaft;
a stopper engagement section provided at the second hinge section to rotate together with the second hinge shaft; and
a stopper provided at the first hinge section, wherein the stopper prevents rotation of the second hinge section but allows the second hinge section to freely rotate after the first hinge section has rotated by a predetermined angle around the first hinge shaft, wherein the stopper has a guide surface for allowing the stopper engagement section to rotate, and the guide surface of the stopper has a height allowing lower portions of the surfaces of the stopper engagement section along the length to pass beyond the guide surface when the first hinge section rotates by a predetermined angle, and wherein the guide surface is divided into a horizontal surface and an inclined surface, and an inclination angle of the inclined surface is in a range of more than 0° and not more than 60°.

15. The swivel of claim 14, wherein the stopper engagement section has an elongated plate shape with a length greater than a width and surfaces of sides of the stopper engagement section along the length contact the stopper to prevent rotation of the second hinge section when the first hinge section has not been rotated by the predetermined angle around the first hinge shaft.

16. The swivel of claim 14, wherein the first hinge section has a body plate provided at both ends thereof with the first hinge shaft having a cylindrical shape, and wherein the second hinge section has a connecting plate provided with the second hinge shaft rotatably coupled to the body plate.

17. A portable terminal comprising:
a main body section;
a folder section coupled to the main body section and movable from an open position where the folder section is shifted away from the main body section to a closed position where the folder section is adjacent to the main body section;
a first hinge section rotatably coupled to the main body section;

a second hinge section coupled to the folder section, wherein the second hinge section is rotatably coupled to the first hinge section, and wherein the second hinge section rotates about a second hinge shaft extending in a direction substantially perpendicular to a first hinge shaft;

a stopper engagement section provided along the second hinge shaft to rotate together with the second hinge shaft; and a stopper configured to restrict movement of the stopper engagement section, wherein the stopper is affixed to the main section between a pair of rotation guide members, wherein the stopper is fixed to the main body section to restrict the second hinge section from freely rotating until the first hinge section rotates by a predetermined angle from the closed position.

18. The portable terminal of claim 17, wherein the stopper engagement section has an elongated plate shape with a length greater than a width and locking surfaces of the engagement section are at least one side of the stopper engagement section.

19. The portable terminal of claim 17, wherein the stopper is formed at an upper portion of the main body section with a guide surface parallel to an upper surface of the main body section, and wherein the guide surface is positioned below the stopper engagement section when the guide surface is parallel to a lower surface of the stopper engagement section.

20. The portable terminal of claim 19, wherein the guide surface of the stopper is divided into a horizontal surface and an inclined surface, and wherein an inclination angle of the inclined surface is in a range of more than 0° and riot more than 60°.

21. The portable terminal of claim 19, wherein the stopper is provided at one end of a click hinge installed by passing through a center of the first hinge shaft of the first hinge section, and a fixing section is provided at one end of the click hinge for fixing the stopper to the main body section.

22. The portable terminal of claim 17, comprising:

first and second magnets correspondingly provided at first and second hinge sections, respectively, wherein an attractive force is created between the first and second magnets when the first and second hinge sections are positioned in parallel to each other.

23. A portable terminal comprising:

a main body section;

a folder section coupled to the main body section and movable from an open position where the folder section is shifted away from the main body section to a closed position where the folder section is adjacent to the main body section;

a first hinge section rotatably coupled to the main body section;

a second hinge section coupled to the folder section, wherein the second hinge section is rotatably coupled to the first hinge section, and wherein the second hinge section rotates about a second hinge shaft extending in a direction substantially perpendicular to a first hinge shaft;

a stopper engagement section provided along the second hinge shaft to rotate together with the second hinge shaft;

a stopper configured to restrict movement of the stopper engagement section, wherein the stopper is fixed to the main body section to restrict the second hinge section from freely rotating until the first hinge section rotates by a predetermined angle from the closed position; and first and second magnets provided at the first and second hinge sections, respectively, wherein an attractive force is created between the first and second magnets when the first and second hinge sections are positioned in parallel to each other.

* * * * *